(12) United States Patent
Ohira et al.

(10) Patent No.: US 7,604,382 B2
(45) Date of Patent: Oct. 20, 2009

(54) VEHICLE COMPONENT ASSEMBLY FOR A STRADDLE TYPE VEHICLE

(75) Inventors: Masaru Ohira, Shizuoka-ken (JP); Torao Matsuzawa, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 244 days.

(21) Appl. No.: 11/316,356

(22) Filed: Dec. 22, 2005

(65) Prior Publication Data

US 2006/0139939 A1 Jun. 29, 2006

(30) Foreign Application Priority Data

Dec. 28, 2004 (JP) .............................. 2004-379935

(51) Int. Cl.
*F21S 8/10* (2006.01)
(52) U.S. Cl. ...................... 362/476; 362/473; 362/549
(58) Field of Classification Search .................. 362/476, 362/475, 473, 548, 549, 154; 180/68.5, 218, 180/219, 220
See application file for complete search history.

(56) References Cited

U.S. PATENT DOCUMENTS

| | | | | |
|---|---|---|---|---|
| 2,136,749 | A | * | 11/1938 | Martino ..................... 180/68.5 |
| 2,504,265 | A | * | 4/1950 | Jozif ......................... 180/68.5 |
| 2,754,452 | A | | 7/1956 | Onksen |
| 2,792,899 | A | | 5/1957 | Piatti |
| 3,788,532 | A | | 1/1974 | Bish |
| 5,955,945 | A | | 9/1999 | Fuhrer |
| 6,031,452 | A | | 2/2000 | Trbovich |
| 6,332,639 | B1 | | 12/2001 | Tanaka et al. |
| 6,428,076 | B2 | | 8/2002 | Sumada et al. |
| 6,538,567 | B2 | | 3/2003 | Stewart |
| 6,615,945 | B2 | | 9/2003 | Minami et al. |
| 6,626,260 | B2 | | 9/2003 | Gagnon et al. |
| 6,732,830 | B2 | | 5/2004 | Gagnon et al. |
| 6,745,862 | B2 | * | 6/2004 | Morii et al. .................. 180/296 |
| 6,776,250 | B2 | | 8/2004 | Kuji et al. |

(Continued)

FOREIGN PATENT DOCUMENTS

EP 0459286 * 12/1991

(Continued)

OTHER PUBLICATIONS

U.S. Appl. No. 11/280,947 (Pub. No. 2007-0216524), including file history.

(Continued)

*Primary Examiner*—Sharon E Payne
(74) *Attorney, Agent, or Firm*—Knobbe, Martens, Olson & Bear, LLP

(57) ABSTRACT

A vehicle component assembly for a straddle type vehicle (e.g., a motor scooter) is provided that can increase the space for internal components in the front portion of the vehicle. The assembly comprises a front portion of a vehicle body cover located at a front portion of the straddle type vehicle. A vehicle component and a vehicle component holder are disposed within the front portion of the vehicle body cover between a head pipe and a headlight of the vehicle. In one embodiment, the vehicle component comprises a battery. Preferably, the vehicle component assembly is configured such that a lower portion of the vehicle component is located below an upper portion of the headlight of the vehicle.

27 Claims, 8 Drawing Sheets

U.S. PATENT DOCUMENTS

| | | |
|---|---|---|
| 6,892,842 B2 | 5/2005 | Bouffard et al. |
| 7,066,293 B2 * | 6/2006 | Kakizoe ............... 180/219 |
| 7,125,134 B1 | 10/2006 | Hedlund et al. |
| 7,374,192 B2 | 5/2008 | Mimasa |
| 2001/0013708 A1 | 8/2001 | Tanaka et al. |
| 2001/0015190 A1* | 8/2001 | Kawamoto ............ 123/196 A |
| 2002/0044052 A1 | 4/2002 | Stewart |
| 2004/0145898 A1 | 7/2004 | Ase et al. |
| 2005/0064785 A1* | 3/2005 | Lee ...................... 446/454 |
| 2005/0117359 A1 | 6/2005 | Takahashi et al. |

FOREIGN PATENT DOCUMENTS

| | | | |
|---|---|---|---|
| GB | 2141392 | * | 12/1984 |
| JP | 59143721 A | * | 8/1984 |
| JP | 61012448 A | * | 1/1986 |
| JP | 02136383 A | | 5/1990 |
| JP | 09150765 A | | 6/1997 |
| JP | 2002-234477 | | 8/2002 |

OTHER PUBLICATIONS

U.S. Appl. No. 11/284,793 (Pub. No. 2006-0124379), including file history.

U.S. Appl. No. 11/316,689 (Pub. No. 2006-0193143), including file history.

* cited by examiner

VEHICLE COMPONENT ASSEMBLY FOR A STRADDLE TYPE VEHICLE

CROSS-REFERENCE TO RELATED APPLICATIONS

This application is based on and claims priority under 35 U.S.C. § 119(a)-(d) to Japanese Patent Application No. 2004-379935, filed Dec. 28, 2004, the entire content of which is hereby incorporated by reference.

BACKGROUND OF THE INVENTION

1. Field of the Invention

The present invention relates to straddle type vehicles in general and, in particular, to a straddle type vehicle having a vehicle component assembly that can maximize space for internal components in the front portion of the vehicle.

2. Description of the Related Art

Straddle type vehicles (e.g., motor scooters) typically have a front portion of a vehicle body cover positioned in front of the head pipe of the vehicle. Such front portion of the vehicle body cover often defines an interior space in the front portion of the vehicle that is capable of housing various components. For example, a battery can be housed within the front portion of the vehicle body cover. Typically, the front cover is divided into three parts: a center portion, a right side portion, and a left side portion. The battery is often mounted on a coupling member that couples the right side portion and the left side portion together. In such a configuration, the battery is covered by the center portion of the front cover. However, in typical straddle type vehicles, space is limited within the front portion of the vehicle body and the above-described battery assembly often consumes substantially the entire interior space available within the front portion of the vehicle.

In addition, a headlight typically is positioned on a handle bar cover located above the front portion of the vehicle body cover. The front cover, including the headlight, is likely to be relatively high because an interior area of the front portion of the vehicle body cover houses various vehicle components and the headlight typically is located above such vehicle components. As a result, prior designs of the front portion of the vehicle body cover are limited and it is difficult to construct a front cover, including a headlight, which is lower to the ground. A front cover that is lower to the ground is desirable because such a configuration can improve the aerodynamics of the vehicle so as to minimize wind resistance and thereby improve operation of the vehicle. In addition, such a configuration is more aesthetically pleasing to some users of straddle type vehicles.

SUMMARY OF THE INVENTION

Therefore, an object of the present invention is to provide a straddle type vehicle that can house one or more vehicle components, such as a battery, within a front portion of the vehicle wherein the space available for internal components in the front portion of the vehicle is greatly increased and the height of the front portion of the vehicle body cover is greatly reduced.

In accordance with one aspect of the present invention, a straddle type vehicle comprises at least one wheel that rotates about a generally horizontal axis. A vehicle body is supported by the at least one wheel and a vehicle body cover extends over a portion of the vehicle body. A front portion of the vehicle body cover is located in a front portion of the vehicle. In addition, a head pipe and a headlight are located in the front portion of the vehicle such that the headlight is positioned in front of the head pipe. A vehicle component and a vehicle component holder are also provided such that the vehicle component holder is capable of holding the vehicle component and is positioned between the head pipe and the headlight of the straddle type vehicle. In one embodiment, the vehicle component comprises a battery.

Another aspect of the present invention involves a straddle type vehicle comprising at least one wheel that rotates about a generally horizontal axis and a vehicle body supported by the at least one wheel. A vehicle body cover extends over a portion of the vehicle body and includes a front portion of the vehicle body cover which is located at a front portion of the vehicle. In addition, the vehicle comprises a first vehicle component and a second vehicle component. A vehicle component holder is located between a head pipe and a headlight in the front portion of the vehicle. In one embodiment, the vehicle component holder can hold the first vehicle component; which can be a battery, and the second vehicle component, which can be a smaller component such as a relay, a fuse box, an engine control unit (ECU), or a remote control unit.

In accordance with an additional aspect of the present invention, a straddle type vehicle comprises at least one wheel that rotates about a generally horizontal axis. A vehicle body is supported by the at least one wheel and a vehicle body cover extends over a portion of the vehicle body. A front portion of the vehicle body cover is located in a front portion of the vehicle. In addition, a head pipe and a headlight are located in the front portion of the vehicle such that the headlight is positioned in front of the head pipe. In this embodiment, a battery and a battery holder are located at least partially within the vehicle body cover and preferably disposed between the head pipe and headlight.

BRIEF DESCRIPTION OF THE DRAWINGS

These and other features, aspects, and advantages of the present invention will now be described in connection with preferred an embodiment of the invention by reference to the accompanying drawings. The illustrated embodiments, however, are merely examples and are not intended to limit the invention. The drawings include the following eight figures.

DETAILED DESCRIPTION OF THE PREFERRED EMBODIMENT

Figure 1:
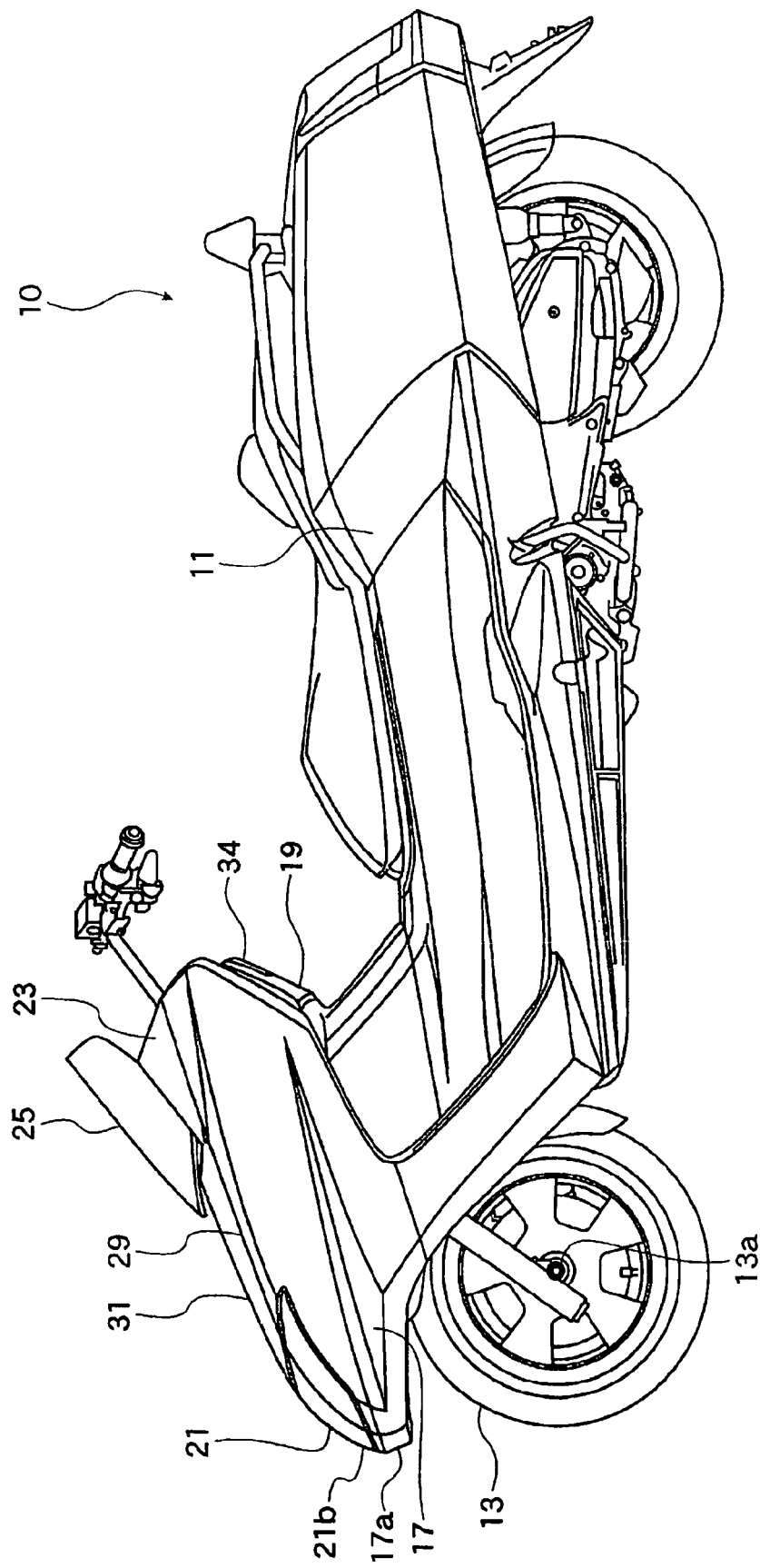
FIG. 1 is a side elevational view of a straddle type vehicle including a vehicle component assembly configured in accordance with a preferred embodiment of the present invention.

A vehicle component assembly is illustrated in the drawings and is described below in the context of a straddle type vehicle. In some configurations, the vehicle component assembly can be used with vehicles that have a wheel that rotates about a generally horizontal axis, a steering column, a steering mechanism coupled to the top of the steering column, and a straddle type seat located substantially near the steering column. The following description relates to a motorized scooter; however, the present vehicle component assembly can be used on other types of straddle type vehicles as well. For example, vehicles in which the vehicle component assembly can be employed include, but are not limited to, a motorcycle, a scooter, and an all-terrain vehicle.

Figure 2:
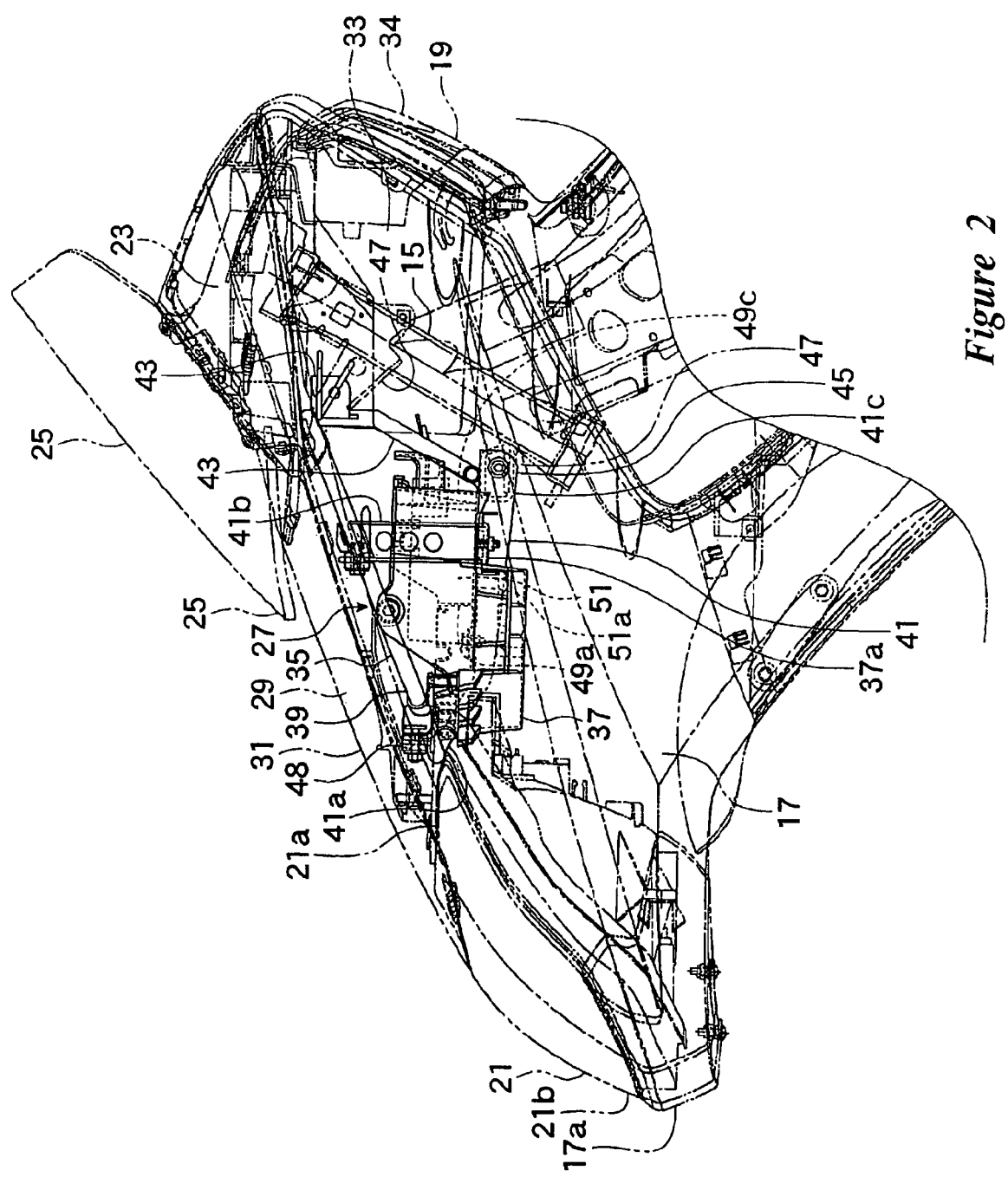
FIG. 2 is a side elevational view showing an interior of a front portion of a vehicle body cover of the straddle type vehicle shown in FIG. 1.
Figure 3:
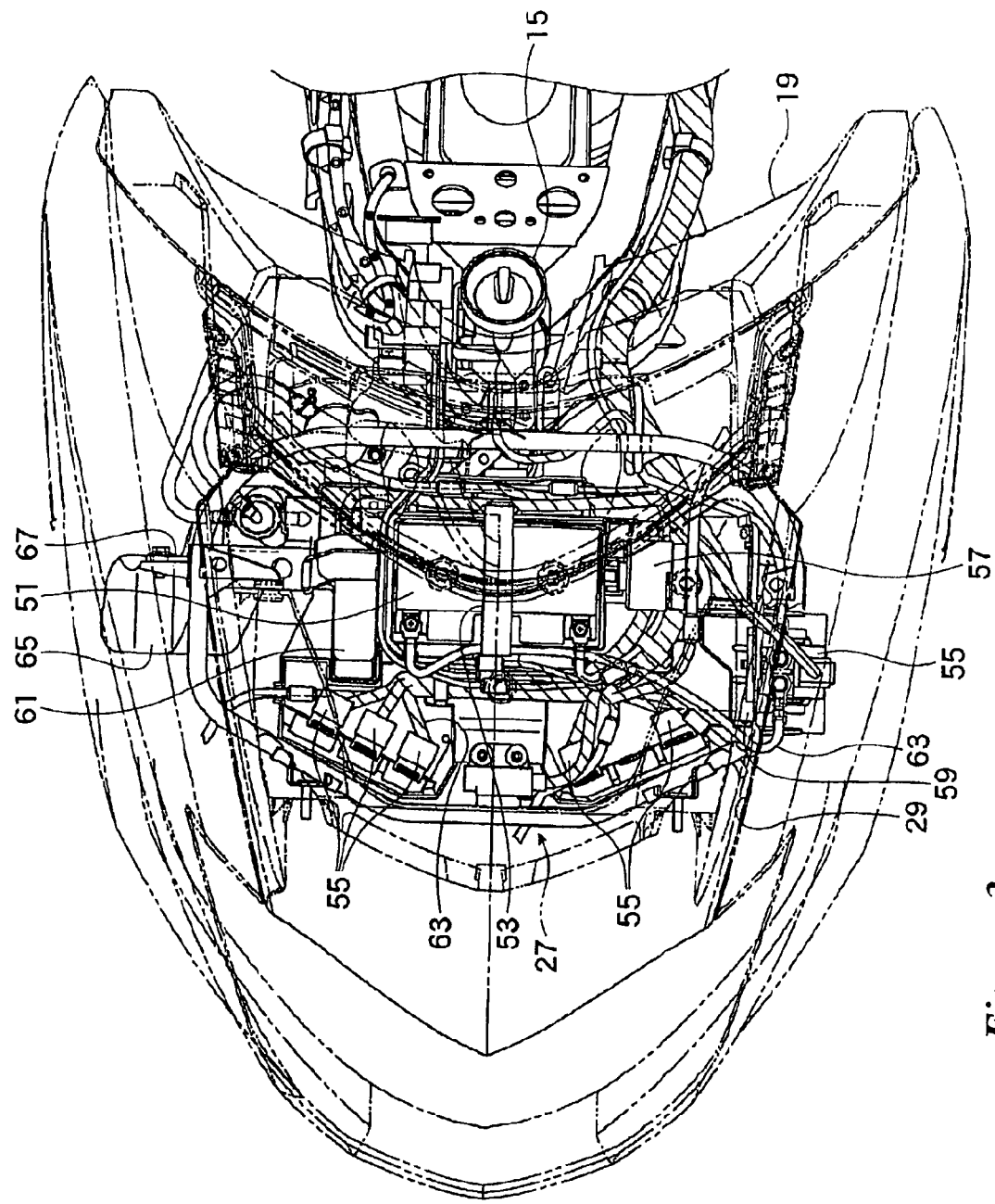
FIG. 3 is a top plan view showing an interior of a front portion of a vehicle body cover of the straddle type vehicle shown in FIG. 1.

With reference to FIGS. 1-3, a straddle type vehicle 10 (e.g., a motor scooter) comprises a vehicle body cover 10. In one embodiment, the vehicle body cover 11 defines substantially the entire vehicle body. A front portion 17 of the vehicle body cover 11 covers a front portion of the vehicle. In one embodiment, the front portion 17 of the vehicle body cover 11 is positioned in front of a head pipe 15, as shown in FIG. 2, and disposed above a front wheel 13. A rear surface cover 19 of the front portion 17 is disposed rearward of the head pipe 15. The rear surface cover 19 preferably encloses a rear side of the front portion 17 of the vehicle body cover 11.

The front portion 17 of the vehicle body cover 11 preferably comprises a front end 17a that is positioned further forward relative to the vehicle than the front wheel 13. In the illustrated configuration, a headlight 21 is located in a front area of the front portion 17 of the vehicle body cover 11 and generally further forward than an axle 13a of the front wheel 13. A leading edge 21b of this headlight 21 can be positioned at the front end 17a of the front portion 17 of the vehicle body cover 11. A right flasher lamp 23 and a left flasher lamp 23 preferably are disposed above the front portion 17 of the vehicle body cover 11 on the respective sides in a horizontal direction (i.e., a side-to-side direction) of the vehicle.

In one embodiment, the front portion 17 of the vehicle body cover 11 comprises a windshield 25. The windshield 25 can be positioned between both of the flasher lamps 23 at a center of a rear portion of the front portion 17 of the vehicle body cover 11. With reference to FIG. 2, the front portion 17 of the vehicle body cover 11 preferably comprises a vehicle component positioning unit 27. The front portion 17 of the vehicle body cover 11 also comprises a vehicle component access opening 29 positioned between the headlight 21 and the windshield 25 so as to be located at least partially above the vehicle component positioning unit 27. An opening bonnet 31 that functions as a lid, which is disposed on at least a portion of the front portion 17 of the vehicle body cover 11, can close the vehicle component access opening 29.

In another embodiment, the rear surface cover 19 is disposed in the rear of the front portion 17 of the vehicle body cover 11. The rear surface cover 19 can enclose an article storing portion 33, as shown in FIG. 2, that can be used to store audio equipment, various small articles, and similar items. The article storing portion 33 defines a storage compartment within the front portion 17 of the vehicle body cover 11. An article access opening 34 of the article storing portion 33 preferably is defined in the vehicle body cover 11. The opening 34 can be selectively closed by the rear surface cover 19. The article storing portion 33 advantageously has an internal space that extends forward from the access opening 34. The article storing portion 33 and the vehicle component positioning unit 27 are preferably juxtaposed with each other in a fore to aft direction of the vehicle.

The vehicle component positioning unit 27 can be placed between the head pipe 15 and the headlight 21. In one embodiment, the vehicle component positioning unit 27 comprises a stay 35 that is secured to the head pipe 15. One preferred configuration of the installation stay is shown in detail in FIGS. 4 and 5. In another embodiment, the vehicle component positioning unit 27 comprises a vehicle component receiver 37 that is fixed to the stay 35. One preferred configuration of the vehicle component receiver 37 is shown in detail in FIGS. 6 through 8. In one embodiment, the vehicle component positioning unit 27 can be used to store cargo or other personal belongings of a user of the vehicle. In the preferred configuration, however, the vehicle component positioning unit can be used to house a particular vehicle component, such as a battery for instance but without limitation.

Figure 4:
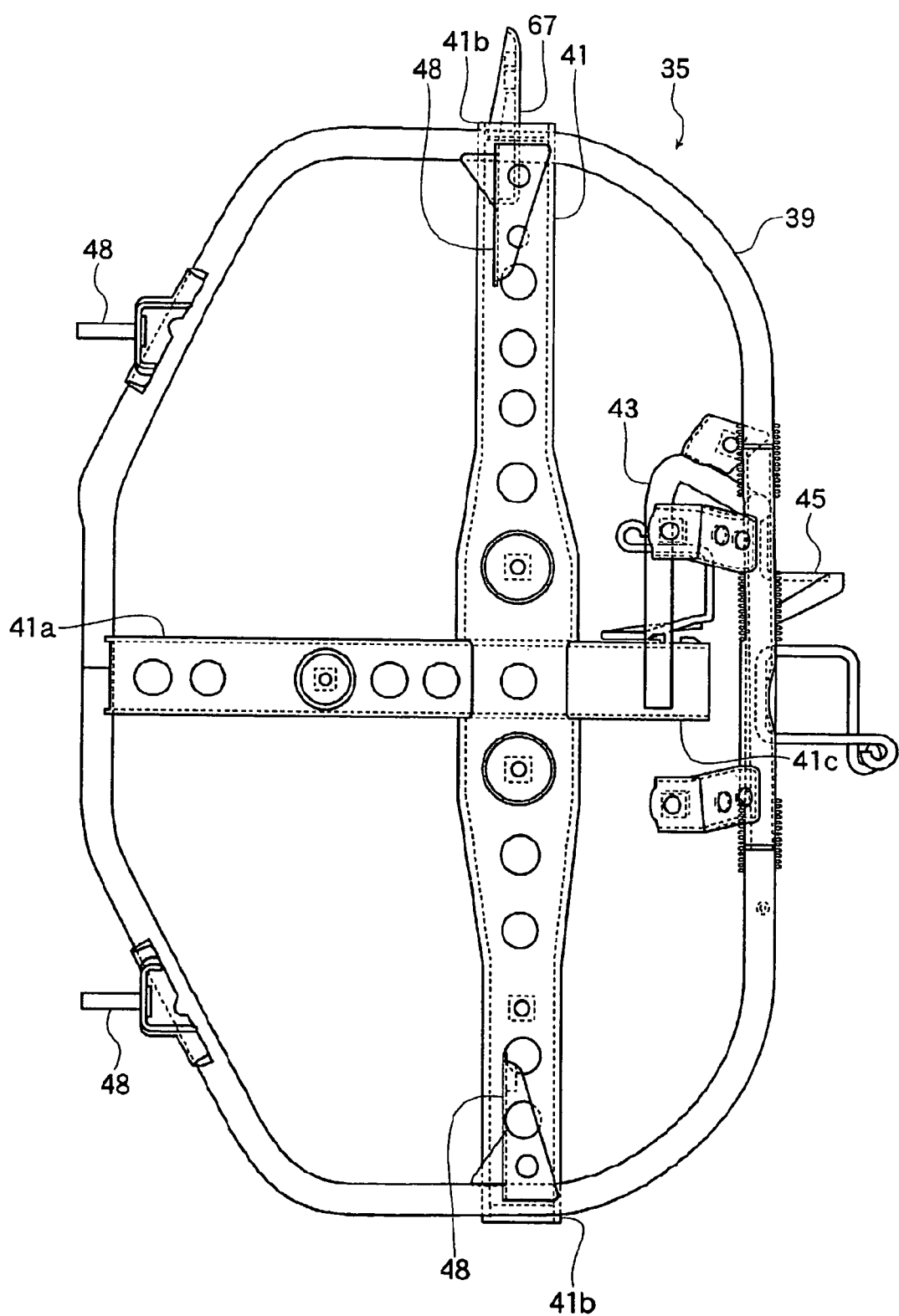
FIG. 4 is a top plan view of a stay of the straddle type vehicle shown in FIG. 1.

With reference to FIG. 4, the stay 35 preferably comprises a ring-shaped frame 39 having a size generally corresponding to the vehicle component access opening 29. A lower frame 41 is attached to the ring-shaped frame 39. The lower frame 41 comprises a front end 41a and a right end 41b and a left end 41b. The front end 41a, the right end 41b and the left end 41b preferably are coupled to the ring-shaped frame 39. The lower frame preferably comprises a generally cross-shaped configuration that bows downward. A link frame 43 preferably couples a rear end 41c of the lower frame 41 with the ring-shaped frame 39. A top end 43a of the link frame 43 and the rear end 41c of the lower frame each can comprise a link member 45 that can be used to join the stay 35 with the head pipe 15.

With reference again to FIG. 2, the stay 35 is fixed to respective brackets 47 that are disposed at an upper portion and a lower portion of the head pipe 15 using the link members 45. When mounted in this manner, the ring-shaped frame 39 preferably extends obliquely along a circumference of the vehicle component access opening 29 of the front portion 17 of the vehicle body cover 11 while a bottom surface 41d of the lower frame 41 extends in a generally horizontal direction.

Figure 5:
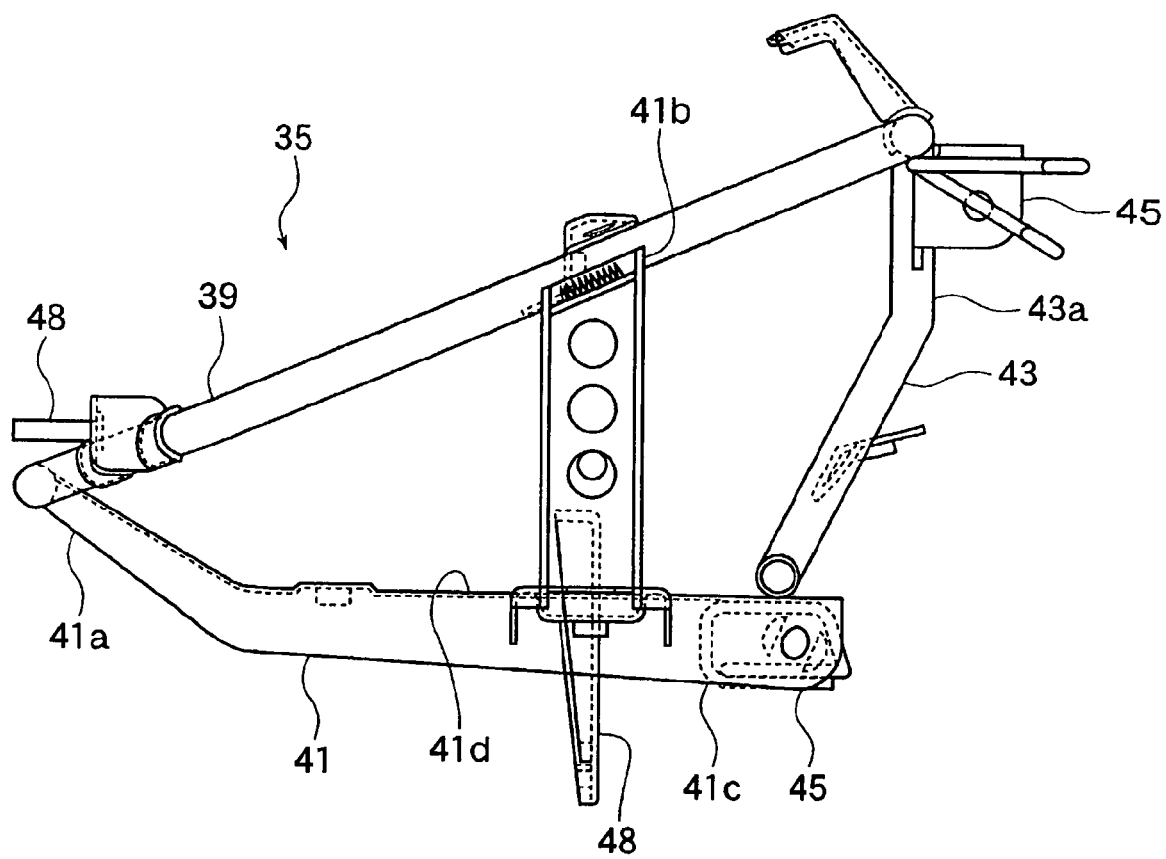
FIG. 5 is a side elevational view of the stay of the straddle type vehicle shown in FIG. 4.

With reference to FIGS. 4 and 5, cover fixing members 48 can be disposed at front end portions of the ring-shaped frame 39 of the stay 35. Preferably, the cover fixing members 48 are positioned on right and left sides of a middle portion of the ring-shaped frame 39. The cover fixing members 48 can be used to substantially fix the front portion 17 of the vehicle body cover 11 to the stay 35. The front portion 17 of the vehicle body cover 11 in the illustrated configuration is attached to the cover fixing members 48 such that the front portion 17 is secured to the head pipe 15 through the stay 35.

Figure 6:
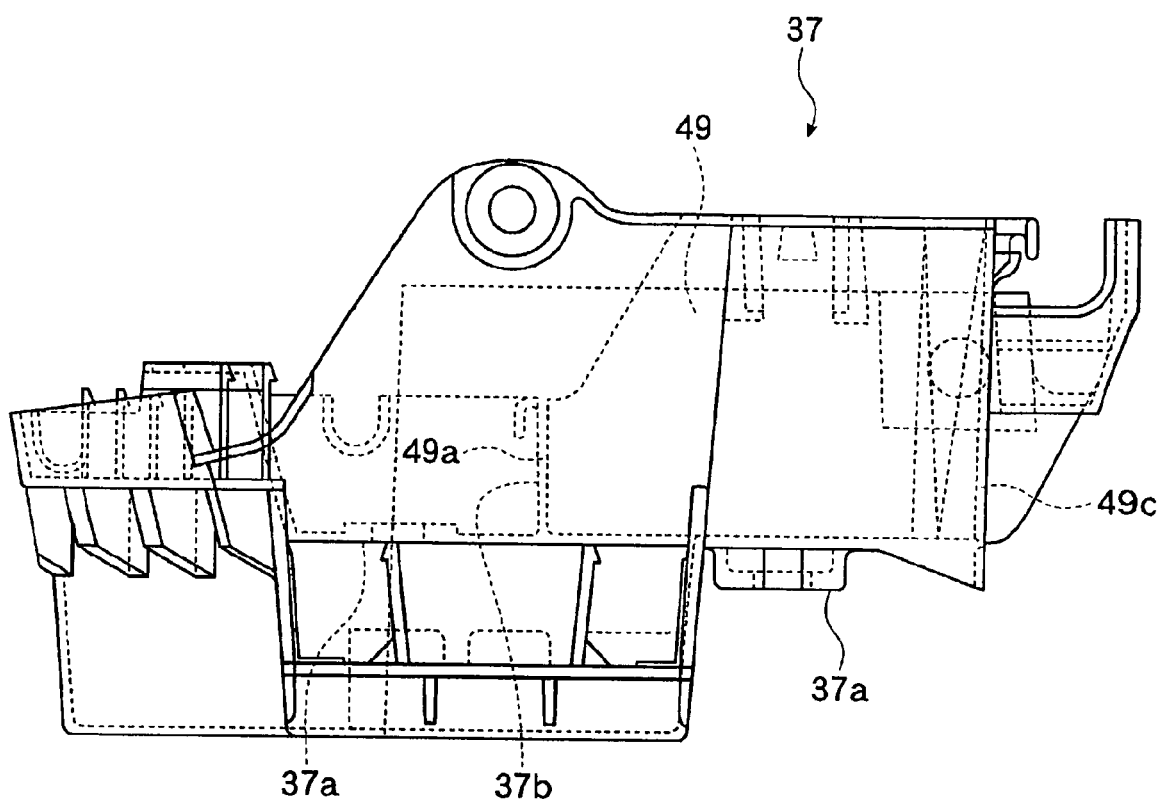
FIG. 6 is a side elevational view of a vehicle component receiver of the straddle type vehicle shown in FIG. 1.
Figure 7:
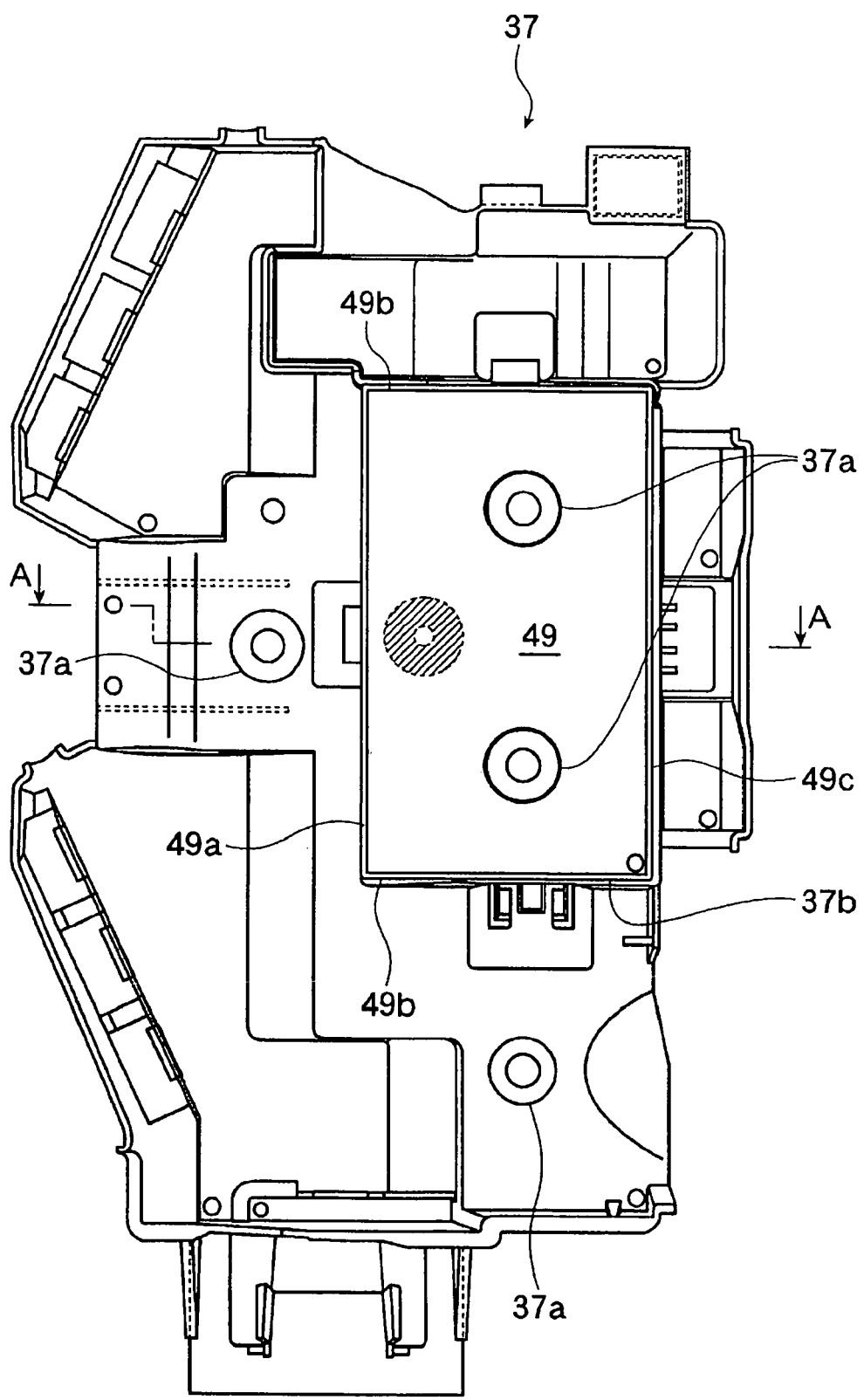
FIG. 7 is a top plan view of the vehicle component receiver of the straddle type vehicle shown in FIG. 6.
Figure 8:
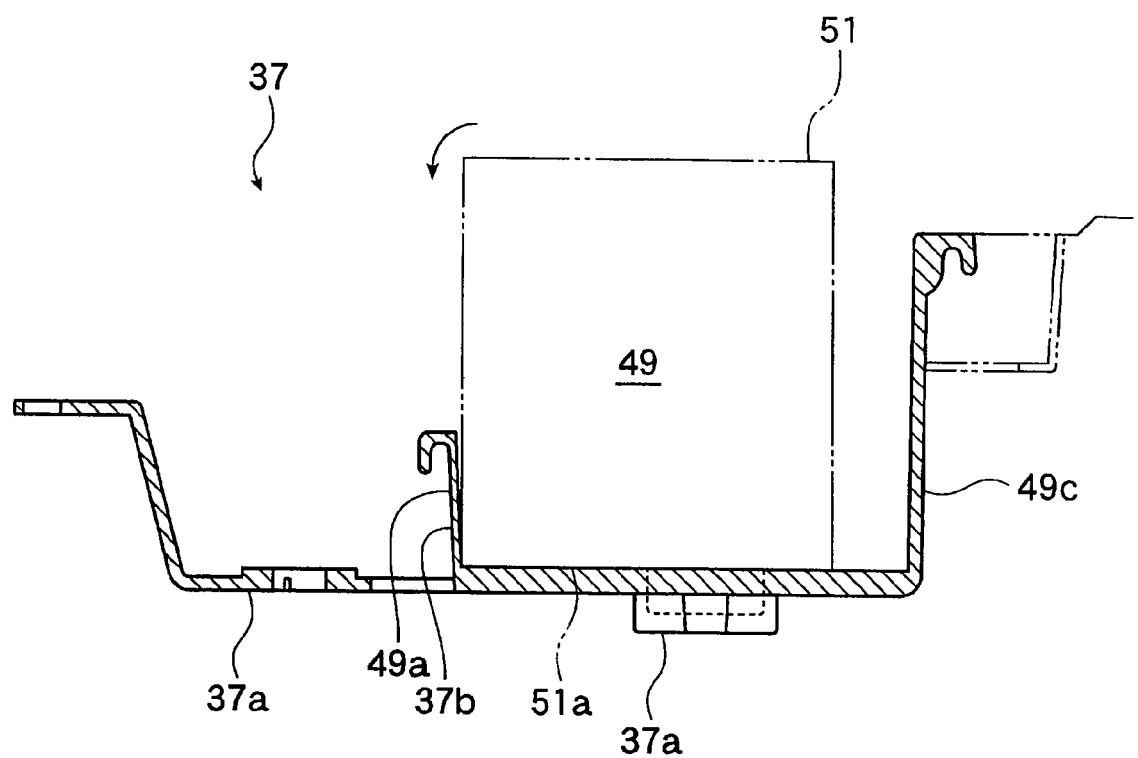
FIG. 8 is a cross-sectional view of the vehicle component receiver holding a vehicle component of the straddle type vehicle shown in FIG. 1 taken along line AA of FIG. 7.

With reference now to FIGS. 6 through 8, the vehicle component receiver 37 can be secured in any suitable manner to the stay 35. The vehicle component receiver 37 can comprise a housing made of synthetic resin. The housing preferably opens in an upward direction. In other words, the vehicle component receiver 37 preferably comprises walls that define the bottom and the circumferential side portions. In one preferred configuration, the bottom and side portions are made from a single molded component (i.e., the bottom and side portions are integrally formed). The vehicle component receiver 37 can be fixed to the lower frame 41 of the stay 35 using a mount portion 37a. In the illustrated configuration, the mount portion 37a is defined on the bottom face of the vehicle component receiver 37.

In another embodiment, the battery tray or holder 49 can be formed inside of the vehicle component receiver 37 and can be separated from the balance of the vehicle component receiver 37 by a partition wall 37b. The battery holder 49 preferably is positioned adjacent to the head pipe 15 in a central area of a rear portion of the interior of the vehicle component receiver 37 such that the battery holder 49 is substantially fixed to the stay 35. In this position, the weight of the battery is more evenly distributed and the weight of the battery generates less of a moment arm on the head pipe 15 as a result of vertical movements of the vehicle during operation over bumps in the road and the like.

With reference again to FIGS. 2 and 3, the battery holder 49 preferably holds a battery 51. An upper support 53 can comprise a rubber band, a metal bracket, or the like and can be coupled with the partition wall 37*b*. The upper support 53 can be provided to secure the battery 51 in position. As shown in FIG. 2, by using the battery holder 49, the battery 51 can be mounted in such a manner that a lower portion 51*a* of the battery 51 can be positioned lower than an upper portion 21*a* of the headlight 21. In other words, the headlight 21 and the battery 51 can be arranged so that the upper portion 21*a* of the headlight 21 and the lower portion 51*a* of the battery 51 overlap with each other when viewed from the front of the straddle type vehicle 10.

In addition, a front wall 49*a*, which is defined by the partition wall 37*b* of the battery holder 49, can be positioned lower than the side walls 49*b* and a rear wall 49*c*. In an embodiment where the upper support 53 of the battery 51 does not comprise a metal bracket or the like, the battery 51 is capable of tilting forward relative to the vehicle component receiver 37.

In another embodiment, the interior of the vehicle component receiver 37 contains various vehicle components which are lighter than the battery. The other vehicle components can be are substantially fixed to locations on a front portion and lateral portions of the battery holder 49. Such vehicle components can comprise, for example, a relay 55, a fuse box 57, an engine control unit (ECU) 59, a remote control unit 61, and similar vehicle components. Such vehicle components, including the battery 51, can be connected to each other through wiring 63 to form any desired electrical circuits.

In yet another embodiment, in the interior of the front portion 17 of the vehicle body cover 11, a recovery tank 65 for engine coolant can be positioned generally adjacent to the vehicle component positioning unit 27 at a location generally forward of the head pipe 15. This recovery tank 65 preferably is fixed to a bracket 67 that is positioned at the stay 35 and the vehicle component receiver 37.

In the illustrated straddle type vehicle 10, the vehicle component positioning unit 27 holds vehicle components such as, for example but without limitation, the battery 51, between the head pipe 15 and the headlight 21 within the front portion 17 of the vehicle body cover 11. Preferably, the upper portion of the head light 21 and the lower portion of the battery 51 overlap with each other when viewed from the front of the straddle type vehicle 10.

Also in the illustrated configuration, a vertical length (i.e., a top-to-bottom length) of the region in which the headlight 21 and the vehicle component disposing portion 27 are positioned can be reduced. In other words, if the vehicle component positioning unit 27 is placed in front of the headlight 21, and the headlight 21 and the vehicle component positioning unit 27 overlap with each other, the vehicle component positioning unit 27 shades the light emitted from the headlight 21. Thus, the headlight 21 and the vehicle component positioning unit 27 need to be spaced apart from each other and the length in the vertical direction therefore is naturally longer. However, if the vehicle component positioning unit 27 is mounted on the head pipe 15 side of the headlight 21, as in the illustrated embodiment, the headlight 21 and the vehicle component positioning unit 27 can overlap with each other in the vertical direction, which reduces the overall length in the vertical direction.

Consequently, the height of the front portion 17 of the vehicle body cover 11 can be decreased. In particular, even though the headlight 21 has a height which is longer than its width, the height of the front portion 17 of the vehicle body cover 11 can be reduced. Of course, reducing the height of the front portion 17 of the vehicle body cover 11 can have significant effects upon vehicle performance.

In one embodiment, the lower portion 51*a* of the battery 51 is positioned lower than the upper portion of the headlight 21. Thus, even though the battery 51, which has a greater height relative to the other vehicle components positioned in the same region, is housed within the front portion 17 of the vehicle body cover 11, the height of the front portion 17 of the vehicle body cover 11 still can be reduced.

Advantageously, because the headlight 21 is positioned in front of the axle 13*a* of the front wheel 13 in the illustrated straddle type vehicle 10, the headlight 21 can be located in a lower position. Consequently, the front portion 17 of the vehicle body cover 11 can be located at a position that is closer to the ground than would otherwise be possible with prior straddle type vehicles.

In addition, by placing the battery 51 at the vehicle component positioning unit 27, the battery 51 and the headlight 21, both of which are relatively heavy, are positioned forward of the head pipe 15. The center of gravity thus can be placed at a location that is as far as possible forward relative to the straddle type vehicle 10 so that steering stability can be improved.

Another benefit of the described configuration is that the battery 51 can be disposed closer to the head pipe 15 in the interior of the vehicle component receiver 37 while other vehicle components that are lighter than the battery 51 can be positioned either in front of the battery 51 or on the lateral sides of the battery 51. Accordingly, the weight balance of the vehicle component positioning unit 27 can be improved and steering stability and the like also can be improved.

Advantageously, the recovery tank 65 for the coolant also can be disposed adjacent to the vehicle component positioning unit 27 within the front portion 17 of the vehicle body cover 11. Because the recovery tank 65, which is relatively heavy, can further increase the load distributed forward of the front wheel, the center of gravity can be positioned yet further forward and steering stability can be even further improved.

In addition, in the illustrated straddle type vehicle 10, the vehicle component positioning unit 27 detachably holds the battery 51 and also holds other vehicle components. The vehicle component access opening 29 can be disposed generally above the vehicle component positioning unit 27, and the opening bonnet 31, which can have opening and closing positions, closes the vehicle component access opening 29. Thus, a number of vehicle components can be concentrated within the vehicle component receiver 37. When the opening bonnet 31 is removed to open the vehicle component access opening portion 29, the battery 51 can be easily mounted or removed from a particular position and maintenance or the like for a number of vehicle components can be easily performed from a location above the front portion 17 of the vehicle body cover 11. As explained above, the front portion 17 of the vehicle body cover 11 is at a relatively low position, which further improves serviceability of the components positioned below the access opening 29.

Because the vehicle components are concentrated within the vehicle component receiver 37, the wiring 63 among the respective vehicle components can be shorter and labor necessary to complete the wiring work can be performed more easily. Further, if the battery 51 or other vehicle components are preassembled with the vehicle component receiver 37 and the vehicle component receiver 37 is mounted on the vehicle body when the straddle type vehicle is assembled, a number of vehicle components can be easily attached. The assembly work of the straddle type vehicle can, therefore, be performed more easily.

Because the vehicle component access opening 29 is defined between the windshield 25 and the headlight 21, the opening bonnet 31 can be easily removed to open the vehicle component access opening 29 so long as the windshield 25 is attached. Maintenance service thus can be performed more easily.

In one embodiment, because the vehicle component receiver 37 is configured so that the battery 51 can tilt forward, the battery 51 can be easily taken out by only being tilted forward, even though the vehicle component access opening 29 slants downward in a forward direction. Because of this arrangement, the area of the vehicle component access opening 29 can be smaller.

Advantageously, the article storing portion 33 having the article access opening 34 that opens at the rear surface cover 19, and the article storing portion 33 and the vehicle component positioning unit 27 are juxtaposed in the fore to aft direction of the vehicle (i.e., arranged in series). Thus, the width of the vehicle component positioning unit 27 can be larger than if the article storing portion 33 and the vehicle component positioning unit 27 are juxtaposed in the transverse direction (i.e., side-to-side direction) of the vehicle 10. The vehicle component positioning unit 27 thus can contribute to easy configuration of the vehicle components and the serviceability of the vehicle 10 can be readily improved.

Further, because the vehicle component positioning unit 27 comprises the vehicle component receiver 37, which is formed with the housing, the bottom portion and the circumferential lateral sides of the vehicle component positioning unit 27 is covered by the housing. In addition, the upper portion of the vehicle component positioning unit 27 can be covered by the opening bonnet 31 of the front portion 17 of the vehicle body cover 11. Thus, mud or the like is less likely to enter the interior of the vehicle component receiver, and the battery 51 or the other vehicle components are not likely to become dirty. Also, because it is relatively difficult to access the battery 51 or the other vehicle components in the interior of the vehicle component receiver 37 without removing an access panel, a lid or the like, such components can be more securely maintained within the vehicle body cover and such components are less likely to be tampered with.

Additionally, in the embodiment described above, the battery holder 49 in the interior of the vehicle component receiver 37 can be formed with the partition wall 37*b* such that the battery 51 can tilt forward. However, in order to allow the battery to tilt more easily, the front wall 49*a*, which is formed with the partition wall 37*b*, can be more easily tilted forward by being coupled with the bottom surface of the vehicle component receiver 37 via a hinge or similar attachment structure. In some configurations, the partition wall 37*b* can be resiliently formed such that it can be elastically deformed to facilitate tilting of the battery for installation and removal.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A straddle type vehicle comprising:
    a front wheel that rotates about a generally horizontal axis;
    a vehicle body supported at least in part by the front wheel;
    a vehicle body cover extending over the front wheel;
    a front portion of the vehicle body cover generally disposed in a front portion of the straddle type vehicle, wherein a front end of the vehicle body cover is disposed in front of a front end of the front wheel;
    a head pipe generally disposed in a front portion of the straddle type vehicle;
    a headlight extending at least partially from the front portion of the vehicle body cover and disposed at least partially in front of the head pipe;
    a battery holder disposed between the head pipe and the headlight and located at least partially within the vehicle body cover;
    a battery positioned on the battery holder and directly between the headlight and the head pipe, wherein at least a portion of a body of the battery is disposed above a top surface of the headlight; and
    an opening defined by the vehicle body proximate to the battery holder, the opening being configured to allow the battery to pass at least partially through the opening, wherein the opening of the vehicle body and the battery holder are directed at least upward.

2. The straddle type vehicle of claim 1, wherein the battery holder comprises a front wall, a rear wall, and a pair of side walls, the front wall comprising a partition wall having a vertical height less than the vertical height of the rear wall and the pair of side walls.

3. The straddle type vehicle of claim 1, wherein a lower portion of the battery is disposed at least partially below an upper portion of the headlight.

4. The straddle type vehicle of claim 1, wherein the battery can be attached to and detached from the battery holder while the battery holder remains located at least partially within the vehicle body.

5. The straddle type vehicle of claim 1 further comprising a lid disposed at least partially on the battery holder for opening and closing the opening of the vehicle body.

6. The straddle type vehicle of claim 5 further comprising a windshield attached to an upper portion of the front portion of the vehicle body cover.

7. The straddle type vehicle of claim 6, wherein the opening of the vehicle body is disposed between the windshield and the headlight.

8. The straddle type vehicle of claim 1, wherein the battery holder comprises a stay coupled to the head pipe, the front portion of the vehicle body cover attached by the stay to at least a portion of the vehicle body and a battery receiver attached to the stay, the battery receiver comprising a case that defines an opening that opens at least partially upward.

9. The straddle type vehicle of claim 8, wherein the battery receiver holds the battery and the front portion of the vehicle body cover at least partially covers the opening in the case.

10. The straddle type vehicle of claim 8, wherein the opening in the battery receiver slants at least partially downward and forward.

11. The straddle type vehicle of claim 8, wherein the battery receiver comprises a front surface, a bottom surface, and a rear surface for holding the battery in a generally horizontal position.

12. The straddle type vehicle of claim 11, wherein the front surface of the battery receiver is disposed at least partially lower than the rear surface of the battery receiver.

13. The straddle type vehicle of claim 1 further comprising a rear surface cover that is connected to a rearward facing portion of the front portion of the vehicle body cover, the rear surface cover enclosing a storage compartment, the storage compartment comprising a rearwardly directed opening that receives the rear surface cover.

14. The straddle type vehicle of claim 13, wherein the storage compartment and the battery holder are positioned substantially in line with each other in a fore to aft direction of the vehicle.

15. The straddle type vehicle of claim 1 further comprising a cooling water recovery tank disposed substantially adjacent to the battery holder and at least partially within the front portion of the vehicle body cover.

16. A straddle type vehicle comprising:
a front wheel that rotates about a generally horizontal axis;
a vehicle body supported at least in part by the front wheel;
a vehicle body cover defining at least a portion of the vehicle body and extending over the front wheel;
a front portion of the vehicle body cover generally disposed in a front portion of the straddle type vehicle, wherein a front end of the vehicle body cover lies farther forward on the vehicle than a front edge of the front wheel;
a head pipe generally disposed in a front portion of the straddle type vehicle;
a headlight extending at least partially from the front portion of the vehicle body cover and disposed at least partially in front of the head pipe;
a battery holder disposed between the head pipe and the headlight and located at least partially within the vehicle body cover; and
a battery and a vehicle component supported by the battery holder directly between the head light and the head pipe, wherein at least a portion of a body of the battery is disposed above a top surface of the headlight;
wherein the vehicle body defines an opening disposed near the battery holder, the opening configured to allow the battery to pass at least partially through the opening such that the opening and the battery holder are directed at least partially upward.

17. The straddle type vehicle of claim 16, wherein the vehicle component is disposed substantially near and coupled to at least one side of the battery.

18. The straddle type vehicle of claim 16, wherein the vehicle component weighs less than the battery.

19. The straddle type vehicle of claim 16, wherein the vehicle component is coupled to the battery via a wire.

20. The straddle type vehicle of claim 16, wherein the battery is disposed substantially adjacent to the head pipe and the vehicle component is disposed substantially near at least one side of the battery.

21. The straddle type vehicle of claim 16, wherein the vehicle component comprises a relay.

22. The straddle type vehicle of claim 16, wherein the vehicle component comprises a fuse box.

23. The straddle type vehicle of claim 16, wherein the vehicle component comprises an engine control unit (ECU).

24. The straddle type vehicle of claim 16, wherein the vehicle component comprises a remote control unit.

25. A straddle type vehicle comprising:
a front wheel that rotates about a generally horizontal axis;
a vehicle body supported at least in part by the front wheel;
a vehicle body cover extending over at least a portion of the vehicle body;
a front portion of the vehicle body cover generally disposed in a front portion of the straddle type vehicle, wherein at least a portion of the front portion of the vehicle body cover is positioned in front of the front wheel;
a head pipe generally disposed in a front portion of the straddle type vehicle;
a headlight disposed at least partially in front of the head pipe;
a battery holder disposed between the head pipe and the headlight and located at least partially within the vehicle body cover; and
a battery mounted to the battery holder directly between the headlight and the head pipe, wherein at least a portion of a body of the battery is disposed above a top surface of the headlight;
wherein the vehicle body defines an opening disposed near the battery holder, the opening being directed upward and configured to allow the battery to pass upward at least partially through the opening.

26. A straddle type vehicle comprising:
a front wheel that rotates about a generally horizontal axis;
a vehicle body supported at least in part by the front wheel;
a vehicle body cover extending over at least a portion of the vehicle body;
a front portion of the vehicle body cover generally disposed in a front portion of the straddle type vehicle;
a head pipe generally disposed in a front portion of the straddle type vehicle;
a headlight disposed at least partially in front of the head pipe;
a battery holder disposed between the head pipe and the headlight and located at least partially within the vehicle body cover; and
a battery mounted to the battery holder between the headlight and the head pipe as viewed in a top plan view, wherein at least a portion of a body of the battery is disposed above a top surface of the headlight;
wherein the vehicle body defines an opening disposed near the battery holder, the opening being directed upward and configured to allow the battery to pass upward at least partially through the opening.

27. The straddle type vehicle of claim 2, wherein the partition wall is resiliently coupled to a bottom surface of the battery holder such that the partition wall is configured to elastically deform to facilitate forward tilting of the battery for installation and removal of the battery.

* * * * *

UNITED STATES PATENT AND TRADEMARK OFFICE
CERTIFICATE OF CORRECTION

| | | |
|---|---|---|
| PATENT NO. | : 7,604,382 B2 | Page 1 of 1 |
| APPLICATION NO. | : 11/316356 | |
| DATED | : October 20, 2009 | |
| INVENTOR(S) | : Masaru Ohira | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 244 days.

Signed and Sealed this
Fourteenth Day of June, 2011

David J. Kappos
*Director of the United States Patent and Trademark Office*